March 25, 1924.

J. B. BATEMAN

ADVERTISING DISPLAY CARD

Filed July 31, 1923

1,487,705

INVENTOR
James B. Bateman
BY
Wallau White
ATTORNEY

Patented Mar. 25, 1924.

1,487,705

UNITED STATES PATENT OFFICE.

JAMES B. BATEMAN, OF ARLINGTON, NEW JERSEY, ASSIGNOR TO BEWTEX PRODUCTS CORPORATION, OF NEW YORK, N. Y., A CORPORATION OF NEW YORK.

ADVERTISING-DISPLAY CARD.

Application filed July 31, 1923. Serial No. 654,861.

*To all whom it may concern:*

Be it known that I, JAMES B. BATEMAN, a citizen of the United States of America, residing at Arlington, Hudson County, New Jersey, have invented new and useful Improvements in Advertising-Display Cards, of which the following is a specification.

For advertising and other purposes it is often desirable to display a picture or printed matter, or a combination of the two, both by day and by night; and it may be desirable to place the picture in such a location that the only safe, practical or feasible way of illuminating the picture is from behind.

In such circumstances it has been customary to reproduce the picture or other matter as the case may be upon paper or other material of sufficient opaqueness so that the picture is readily visible in the daytime by reflected light, such material being, however, thin enough to permit of the picture being displayed at night when illuminated by light transmitted from behind. This method has never given entirely satisfactory results, for the reason that when a strong enough light is placed behind the picture to illuminate the picture sufficiently to make it useful for advertising purposes, the intensity of the light tends to destroy the contrast between the shadows and the high lights, and the picture is not displayed as satisfactorily by the transmitted light as in the daytime by reflected daylight.

Of course transparencies have been made upon glass or other transparent material, which give very good results when displayed by illumination from behind, but these are not satisfactory when viewed by reflected light.

The object of my invention is to produce an article suitable for these uses which will give an equally satisfactory display of the picture by reflected daylight, and by transmitted artificial light.

In the accompanying drawings I have shown by way of illustration a preferred embodiment of my invention. In these drawings similar reference characters designate corresponding parts in all views.

Figure 1:
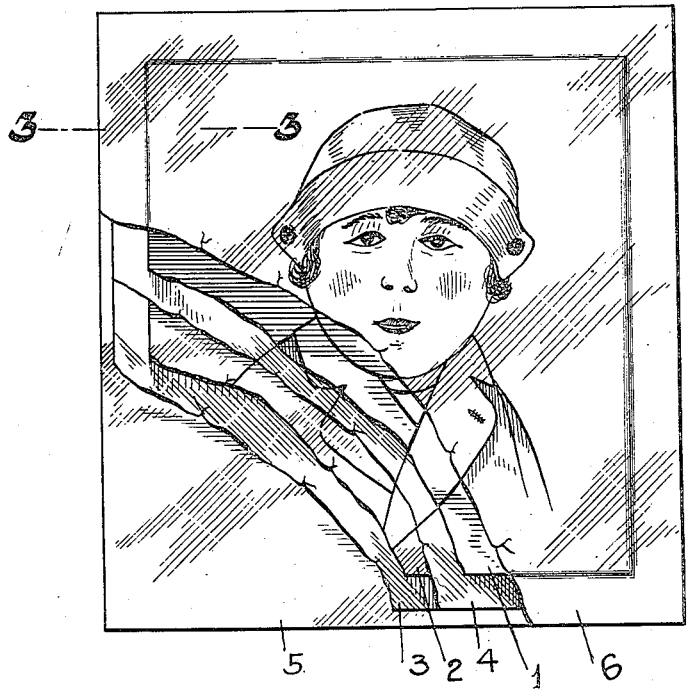
Figure 1 is a front view of a picture or advertising display card embodying my invention, with parts broken away to show the several layers.
Figure 2:
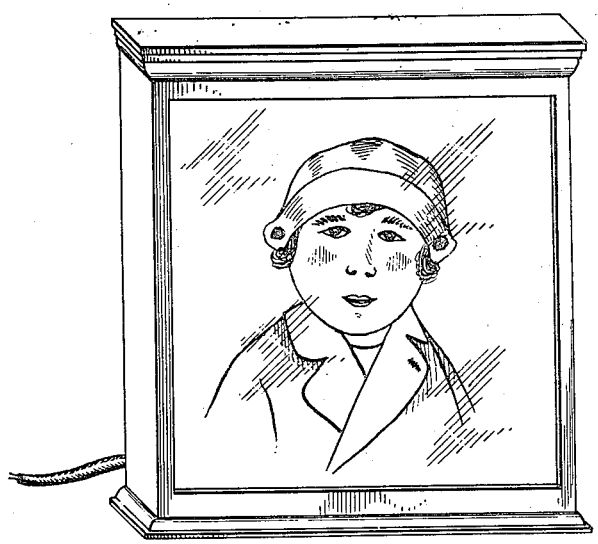
Fig. 2 shows the card arranged for use.
Figure 3:
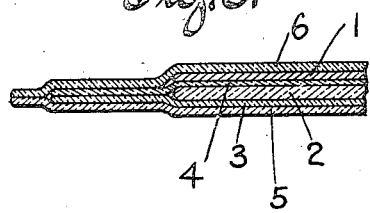
Fig. 3 is a detail showing on an enlarged scale a section on the line 3—3 of Fig. 1.

Referring to these drawings, I make first a picture 1, which may be a photograph, or advertising display matter, and may be black and white or colored as desired. This picture is made upon a suitable paper having sufficient opaqueness so that the picture will be clearly displayed by reflected light.

I then make upon photographic film 2 another picture identical with the first, being a positive, and not a negative print, so that the high lights and shadows in the film positive are the same as in the main picture 1, and not the reverse thereof as is the case in the usual film negative.

In preparing these pictures for use in the manner indicated, I make up what I will call for convenience an advertising display card in the following manner:

I take first the film positive 2 and affix to the back thereof a piece of non-inflammable, transparent cellulose sheet material or stock 3 of the sort frequently used for enclosing pictures and the like, the stock being preferably of about 5/1000 of an inch in thickness; and affix a sheet of similar stock 4 to the front of the film positive, so that the film 2 is encased in and protected by the transparent cellulose material. I then place over this the picture 1, and holding the film and picture up to a source of light which passes through the film positive 2 and the picture itself, I adjust the position of the picture upon the film positive until these coincide exactly, and then apply cement at the corners to hold the picture in this exact position until the product is finished.

I then place these parts upon a piece of the same stock 5 of about 15/1000 of an inch thickness, and place a similar piece of stock 6 upon the whole, putting them in a press in the usual manner to form a rigid plate or card, the picture 1 being plainly visible in reflected light through the upper piece of transparent stock, and the picture being also visible when light is placed behind the same, the effect of the film positive being to add depth to the shadows, while interfering not at all with the high lights, so that the stronger the light that is placed behind the picture, the more clearly is the contrast brought out, and the effect when viewing the picture from the front with light transmitted from behind is practically identical with the effect when viewing the picture from a front reflected light only.

The use of the transparent stock and the methods of causing it to adhere to the picture, and of treating the surface thereof, as with silk to produce a moiré finish if desired, being old and known to those skilled in the art, I have not described these in detail.

What I claim and desire to secure by Letters Patent is:

1. An advertising display card comprising a picture clearly visible by reflected light, and a positive print of the same picture on transparent material placed behind and coincident with the aforesaid picture to enhance the contrast when viewing the picture by transmitted light, and transparent means for holding said pictures in fixed relationship, and rigid for handling.

2. An advertising display card comprising a picture clearly visible by reflected light, and a film positive of the same picture placed behind and coincident with the aforesaid picture to enhance the contrast when viewing the picture by transmitted light, and transparent means for holding said pictures in fixed relationship, and rigid for handling.

3. An advertising display card comprising a picture clearly visible by reflected light, a positive print of the same picture on transparent material, a sheet of transparent protective material secured to each side of said positive, said positive being placed behind and coincident with aforesaid picture, and further sheets of transparent protective material encasing said parts.

In testimony whereof I have signed my name to this specification.

JAMES B. BATEMAN.